United States Patent
Chang et al.

(10) Patent No.: US 7,197,078 B2
(45) Date of Patent: Mar. 27, 2007

(54) VIDEO CODING/DECODING BUFFERING APPARATUS AND BUFFERING METHOD THEREOF

(75) Inventors: Chih-Feng Chang, Hsinchu (TW); Chun-Liang Tu, Jhudong Township Hsinchu County (TW)

(73) Assignee: An Internet Products & Technology Company, Hsinchu (TW)

(*) Notice: Subject to any disclaimer, the term of this patent is extended or adjusted under 35 U.S.C. 154(b) by 96 days.

(21) Appl. No.: 10/906,169

(22) Filed: Feb. 5, 2005

(65) Prior Publication Data
US 2006/0104363 A1    May 18, 2006

(30) Foreign Application Priority Data
Nov. 16, 2004    (TW) .............................. 93135039 A

(51) Int. Cl.
*H04N 7/18*    (2006.01)
(52) U.S. Cl. .............................. 375/240.24; 375/240.29

(58) Field of Classification Search ..............................
375/240.01–240.29
See application file for complete search history.

(56) References Cited
U.S. PATENT DOCUMENTS
6,990,151 B2*  1/2006  Kim et al. .............. 375/240.27
7,068,722 B2*  6/2006  Wells ..................... 375/240.16

* cited by examiner

*Primary Examiner*—Andy Rao
(74) *Attorney, Agent, or Firm*—Jianq Chyun IP Office

(57) ABSTRACT

A video coding/decoding buffering apparatus and a buffering method thereof are provided. The method codes/decodes a current macro block to generate a corresponding unfiltered current macro block data, and a right data area and a bottom data area of the unfiltered current macro block data are stored. The unfiltered current macro block data is filtered to generate a filtered current macro block data, and a right data area and a bottom data area of the filtered current macro block data are stored. The stored data areas are used to code/decode the associated macro blocks.

17 Claims, 3 Drawing Sheets

VIDEO CODING/DECODING BUFFERING APPARATUS AND BUFFERING METHOD THEREOF

CROSS-REFERENCE TO RELATED APPLICATION

This application claims the priority benefit of Taiwan application serial no. 93135039, filed Nov. 16, 2004.

BACKGROUND OF THE INVENTION

1. Field of the Invention

The present invention relates to a video coding/decoding buffering apparatus and a buffering method thereof, and more particularly, to a buffering apparatus using lower memory space and considering the real time characteristic of the video image in coding/decoding the new generation's video image, and a buffering method thereof.

2. Description of the Related Art

"Video coding" is a method for processing video data, wherein a new set of data is generated based on the original image data. The new set of data is called "compression result". It is common that the size of compression result is much smaller than the size of the original image data, thus an image compression effect is provided. In addition, the compression result must be recoverable, that is the original image must be recoverable after performing an appropriate decoding process. Note that the compression result of the image is not an image any more, the real outlook of the original image can be obtained only after a decompression process. The conventional coding/decoding process generally comprises three major phases as follows:

(1) Dividing each video frame into a plurality of pixel macro blocks, such that the video frame can be processed in the macro block layer.

(2) Eliminating the spatial redundancies in the video frame by spatial estimation, or eliminating the temporal redundancies in the continuous frames by motion estimation or motion compensation.

(3) Coding the residual blocks remaining in the video frame, wherein the residual blocks are the difference between the original blocks and the estimated blocks; and the coding is performed by transforming, quantifying, and entropy coding techniques.

In order to provide better video quality and coding efficiency, the new generation video coding/decoding technique generally adds a fourth step: using a filter to eliminate block effect generated in an encoding/decoding process of macro blocks.

Therefore, in order to perform the coding/decoding pipeline in the macro block level, the new generation's video coding/decoding apparatus has to reserve both of the unfiltered image and the filtered image.

In a conventional method, a whole set of unfiltered image has to be stored after the coding/decoding of all macro blocks are completed. Therefore, for a frame having M×N macro block, the size of information to be stored is about M×N×384 Bytes (GIF format: about 396*384 Bytes). Accordingly, a large size of memory space is required.

In another conventional method, a whole set of image is used as a pipeline level, and all information required for filtering of the whole set of image are reserved in the coding/decoding process. Therefore, such method has two disadvantages. First, all information associated to the macro blocks have to be reserved for further filtering process. Secondary, it is not possible to perform the coding/decoding pipeline in macro block level.

SUMMARY OF THE INVENTION

Therefore, it is an object of the present invention to resolve the disadvantage in the conventional technique mentioned above, that is the disadvantages of too much resources are occupied by the memory usage, and the coding/decoding pipeline cannot be performed in the macro block level.

In order to achieve the object mentioned above, the present invention provides a video coding buffering apparatus. The video coding buffering apparatus comprises an image input unit, an unfiltered data buffering unit, a coding unit, a filtered data buffering unit, a filtering unit, a bit stream output unit and an image buffering unit. The image input unit receives a current macro block. The unfiltered data buffering unit stores a part of a previously unfiltered macro block data. Wherein, the previously unfiltered macro block data is the unfiltered data contained in other macro block required for coding the current macro block. The coding unit electrically coupled to the unfiltered data buffering unit and the image input unit is configured to code the current macro block, and to output a plurality of bit streams and the unfiltered current macro block data based on the contents stored in the unfiltered data buffering unit. The filtered data buffering unit stores a part of previously filtered macro block data, and the previously filtered macro block data is the filtered data contained in other macro block required for filtering the current macro block. The filtering unit electrically coupled to the coding unit and the filtered data buffering unit is configured to filter the unfiltered current macro block data based on the data stored in the filtered data buffering unit, so as to generate the filtered current macro block data. The image buffering unit stores the previously coded frame data and the filtered current macro block data mentioned above.

The present invention further provides a video decoding buffering apparatus for generating a current macro block. The video decoding buffering apparatus comprises a bit stream input unit for receiving a current bit stream; an unfiltered data buffering unit for storing another unfiltered data which is not contained in the current bit stream and is required for decoding the current bit stream; a decoding unit electrically coupled to the unfiltered data buffering unit and the bit stream input unit for decoding the current bit stream and generating the unfiltered current macro block data of the current macro block mentioned above; a filtered data buffering unit for storing a part of a previously filtered macro block data, and the previously filtered macro block data is the filtered data contained in other macro block required for filtering the current macro block; a filtering unit electrically coupled to the decoding unit and the filtered data buffering unit for filtering the unfiltered current macro block data mentioned above based on the data stored in the filtered data buffering unit, so as to generate the filtered current macro block data of the current macro block; and an image buffering unit for storing the previously decoded frame data and the filtered current macro block data mentioned above.

The present invention further provides a video coding/decoding buffering method. The method comprises: coding/decoding a current macro block to generate an unfiltered current macro block data; storing a right data area and a bottom data area of the unfiltered current macro block data; and processing next macro block data.

The present invention further provides a video coding/decoding buffering method. The method comprises: filtering an unfiltered current macro block of the current macro block to generate a filtered current macro block data; storing a right data area and a bottom data area of the filtered current macro block data; and processing next macro block data.

In the present invention, only the right data area and the bottom data area are additionally stored for each of the macro block data. Therefore, the present invention is capable of performing the pipelining process on the macro block data, and also significantly reducing the amount of data required for processing the macro block data, such that the required memory space is reduced.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE PREFERRED EMBODIMENTS

Figure 1:
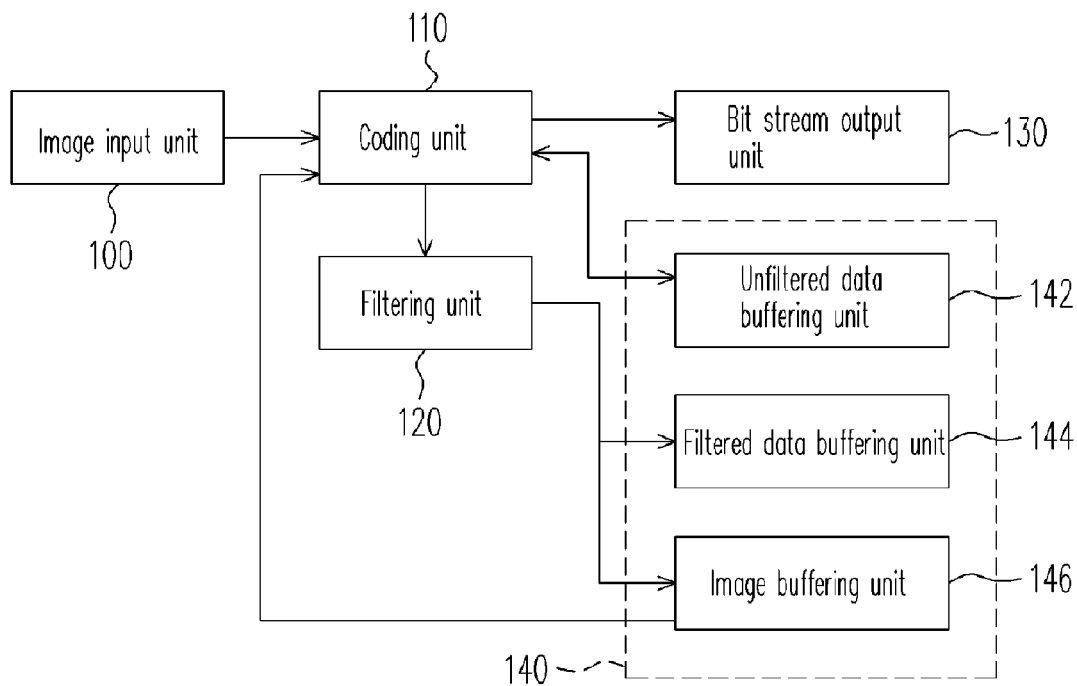
FIG. 1 schematically shows an internal circuit block diagram of a video coding buffering apparatus according to a preferred embodiment of the present invention.

FIG. 1 schematically shows an internal circuit block diagram of a video coding buffering apparatus according to a preferred embodiment of the present invention. The video coding buffering apparatus 10 comprises an image input unit 100, a coding unit 110, a filtering unit 120, a bit stream output unit 130, and a memory apparatus 140. Wherein, the memory apparatus 140 comprises an unfiltered data buffering unit 142, a filtered data buffering unit 144 and an image buffering unit 146.

In the present embodiment, the image input unit 100 receives a current macro block which is to be processed. In order to code the current macro block, a part of a previously unfiltered macro block data is stored in the unfiltered data buffering unit 142. Wherein, the previously unfiltered macro block data is the unfiltered data contained in other macro block required for coding the current macro block. In normal operation, the data stored in the unfiltered data buffering unit 142 comprises a top data area and a left data area that are outside of the current macro block. Wherein, the top data area comprises Y, Cb and Cr of the unfiltered data contained in a scanning line on the top of the current macro block when it is displayed on the screen. The left data area comprises Y, Cb and Cr of the unfiltered data contained in a pixel line on the left and closest to the current macro block when it is displayed on the screen.

Additionally, in order to code the current macro block, a part of a previously filtered macro block data is stored in the filtered data buffering unit 144. Wherein, the previously filtered macro block data is the filtered data contained in other macro block required for filtering the current macro block. Similarly, in normal operation, the data stored in the filtered data buffering unit 144 comprises a top data area and a left data area that are outside of the current macro block. Wherein, the top data area comprises Y, Cb and Cr of the filtered data contained in four scanning lines on the top of the current macro block when it is displayed on the screen. The left data area comprises Y, Cb and Cr of the filtered data contained in four pixel lines on the left and closest to the current macro block when it is displayed on the screen.

In addition, the coding unit 110 electrically coupled to the unfiltered data buffering unit 142 and the image input unit 100 is configured to code the current macro block based on the contents stored in the unfiltered data buffering unit 142, so as to output a plurality of bit streams and the corresponding unfiltered current macro block data. A part of the unfiltered current macro block data is stored in the unfiltered data buffering unit 142 for further macro block processing. The filtering unit 120 electrically coupled to the coding unit 110 and the filtered data buffering unit 144 is configured to filter the unfiltered current macro block data based on the data stored in the filtered data buffering unit 144, so as to generate the corresponding filtered current macro block data. A part of the filtered current macro block data is stored in the filtered data buffering unit 144. In addition, besides storing the previously decoded frame data, the image buffering unit 146 also stores the filtered current macro block data obtained by the filtering unit 120.

Figure 2:
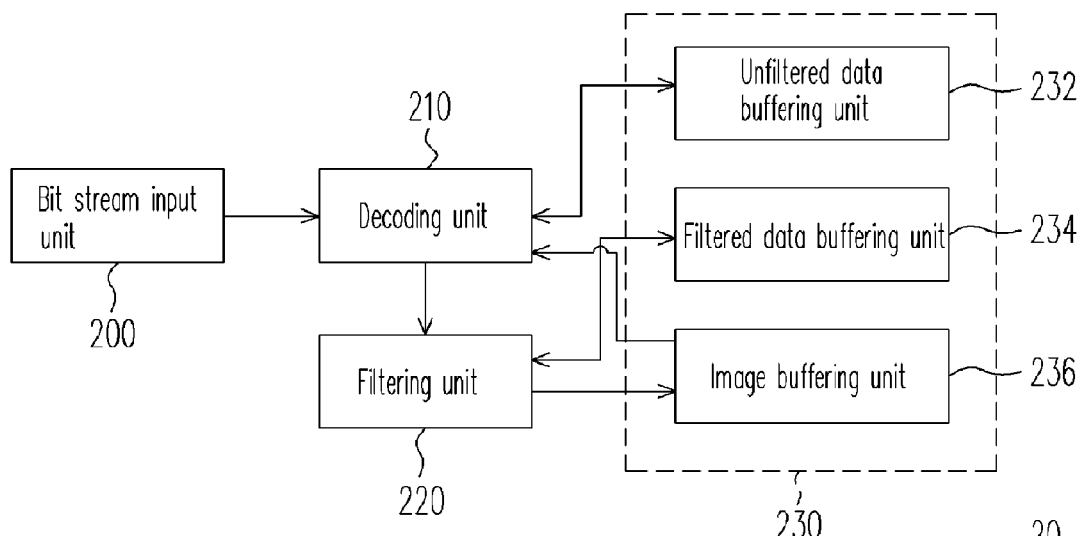
FIG. 2 schematically shows an internal circuit block diagram of a video decoding buffering apparatus according to a preferred embodiment of the present invention.

FIG. 2 schematically shows an internal circuit block diagram of a video decoding buffering apparatus according to a preferred embodiment of the present invention. The video decoding buffering apparatus 20 comprises a bit stream input unit 200, a decoding unit 210, a filtering unit 220 and a memory apparatus 230. Wherein, the memory apparatus 230 comprises an unfiltered data buffering unit 232, a filtered data buffering unit 234, and an image buffering unit 236.

In the present embodiment, the bit stream input unit 200 receives a current bit stream which is to be processed. In order to decode the current bit stream to the corresponding macro block, another unfiltered data which is not contained in the current bit stream and is required for decoding the current bit stream is stored in the unfiltered data buffering unit 232. Wherein, the unfiltered data may be the same as the one described in the previous embodiment, thus its detail is omitted herein. In addition, another part of the previously filtered macro block data is also stored in the filtered data buffering unit 234, and the previously filtered macro block data is the data obtained by filtering other macro block that are required for filtering the current macro block. Similarly, the filtered data may be the same as the one described in the previous embodiment.

The decoding unit 210 electrically coupled to the unfiltered data buffering unit 232 and the bit stream input unit 200 is configured to decode the current bit data stream mentioned above, so as to generate the corresponding unfiltered current macro block data. A part of the unfiltered current macro block data is stored in the unfiltered data buffering unit 232 for further macro block processing. The filtering unit 220 electrically coupled to the decoding unit 210, the filtered data buffering unit 234, and the image buffering unit 236 is configured to filter the unfiltered current macro block data based on the data stored in the filtered data buffering unit 234, so as to generate the corresponding filtered current macro block data. A part of the filtered current macro block data is stored in the filtered data buffering unit 234. In addition, besides storing the previously decoded frame data, the image buffering unit 236 also stores the filtered current macro block data obtained by the filtering unit 220.

In an embodiment of the present invention, the part of the unfiltered current macro block data stored in unfiltered data buffering unit 142 or 232 mentioned above refers to the data of a scanning line on the bottom of the current macro block and the data in an area composed of the last pixels in each rightmost scanning line. The part of the filtered current macro block data stored in filtered data buffering unit 144 or 234 mentioned above comprises the data in four scanning lines on the bottom of the current macro block and the data in an area composed of the four last pixels in each rightmost scanning line.

Figure 3:
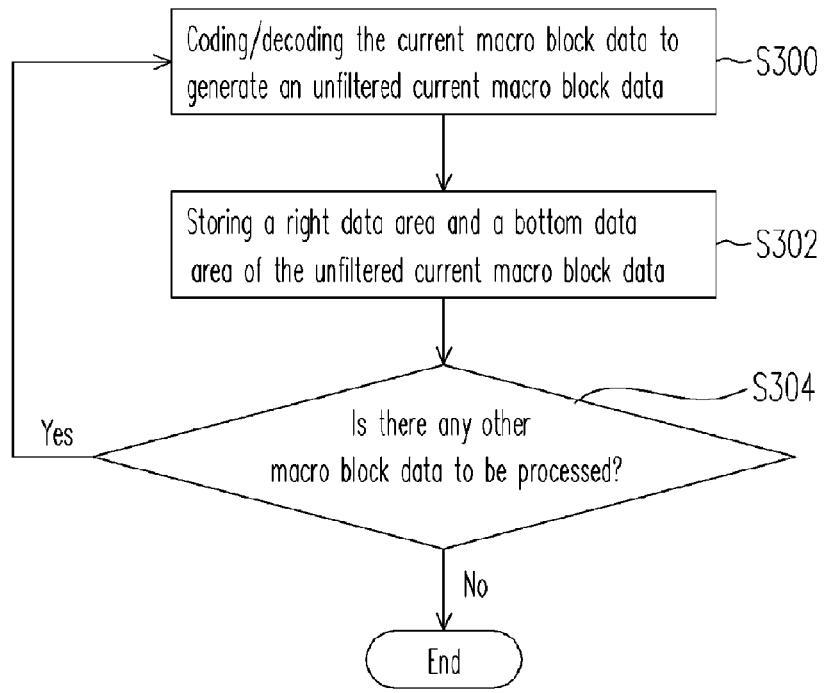
FIG. 3 schematically shows a flow chart illustrating a method for buffering the unfiltered data in video coding/decoding according to an embodiment of the present invention.

In order to have one of the ordinary skill in the art easily understand the operation of the present invention, the operating steps of the present invention are described in more detail hereinafter. FIG. 3 schematically shows a flow chart illustrating a method for buffering the unfiltered data in video coding/decoding according to an embodiment of the present invention. In the present embodiment, first, the current macro block data is coded/decoded to generate an unfiltered current macro block data (step S300). Then, the right data area and the bottom data area of the unfiltered current macro block data are stored (step S302). Wherein, the right data area stored in step S302 comprises Y, Cb and Cr of the right unfiltered data contained in the current macro block, and the "right" herein indicates an area which is on the rightmost and is composed of the last pixels of each scanning line as described in the previous embodiment. In addition, the bottom data area previously stored comprises Y, Cb and Cr of the bottom unfiltered data contained in the current macro block, and the "bottom" herein indicates a scanning line on the bottom of the current macro block as mentioned above. In addition, the data areas stored in step S302 may be used as the data for coding/decoding other macro blocks. Finally, it is determined whether there is any other macro block data to be processed or not (step S304). If yes, the steps mentioned above are repeated.

Figure 4:
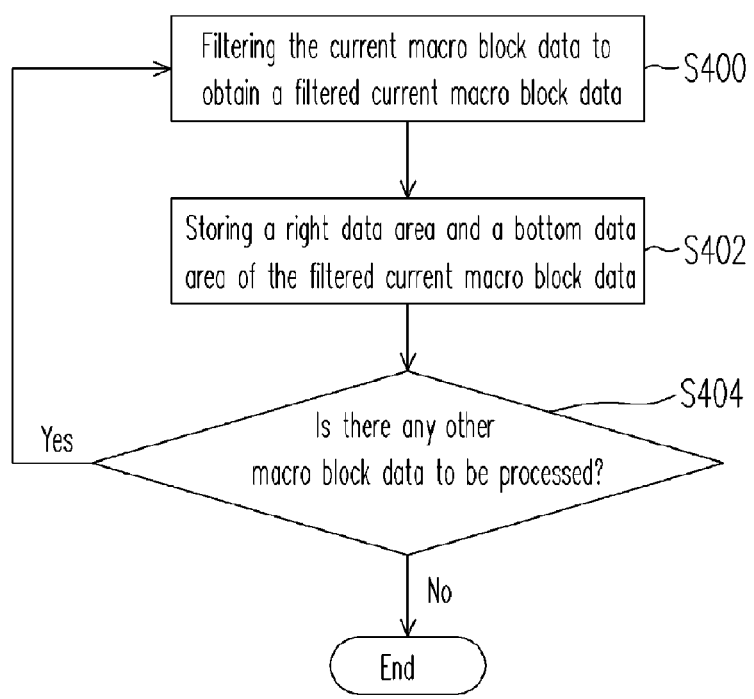
FIG. 4 schematically shows a flow chart illustrating a method for buffering the filtered data in video coding/decoding according to an embodiment of the present invention.

FIG. 4 schematically shows a flow chart illustrating a method for buffering the filtered data in video coding/decoding according to an embodiment of the present invention. In the present embodiment, first, the unfiltered current macro block data mentioned above is filtered to generate a corresponding filtered current macro block data (step S400). Then, the right data area and the bottom data area of the filtered current macro block are stored (step S402). Wherein, the right data area stored in step S402 comprises Y, Cb and Cr of the right unfiltered data contained in the current macro block, and the "right" herein indicates an area which is on the rightmost side and is composed of the last four pixels of each scanning line as described in the previous embodiment. In addition, the bottom data area previously stored comprises Y, Cb and Cr of the bottom unfiltered data contained in the current macro block, and the "bottom" herein indicates the four scanning lines on the bottom of the current macro block as mentioned above. In addition, the data areas stored in step S402 may be used as the data for coding/decoding other macro blocks. Finally, it is determined whether there is any other macro block to be processed or not (step S404). If yes, the steps mentioned above are repeated.

Figure 5:
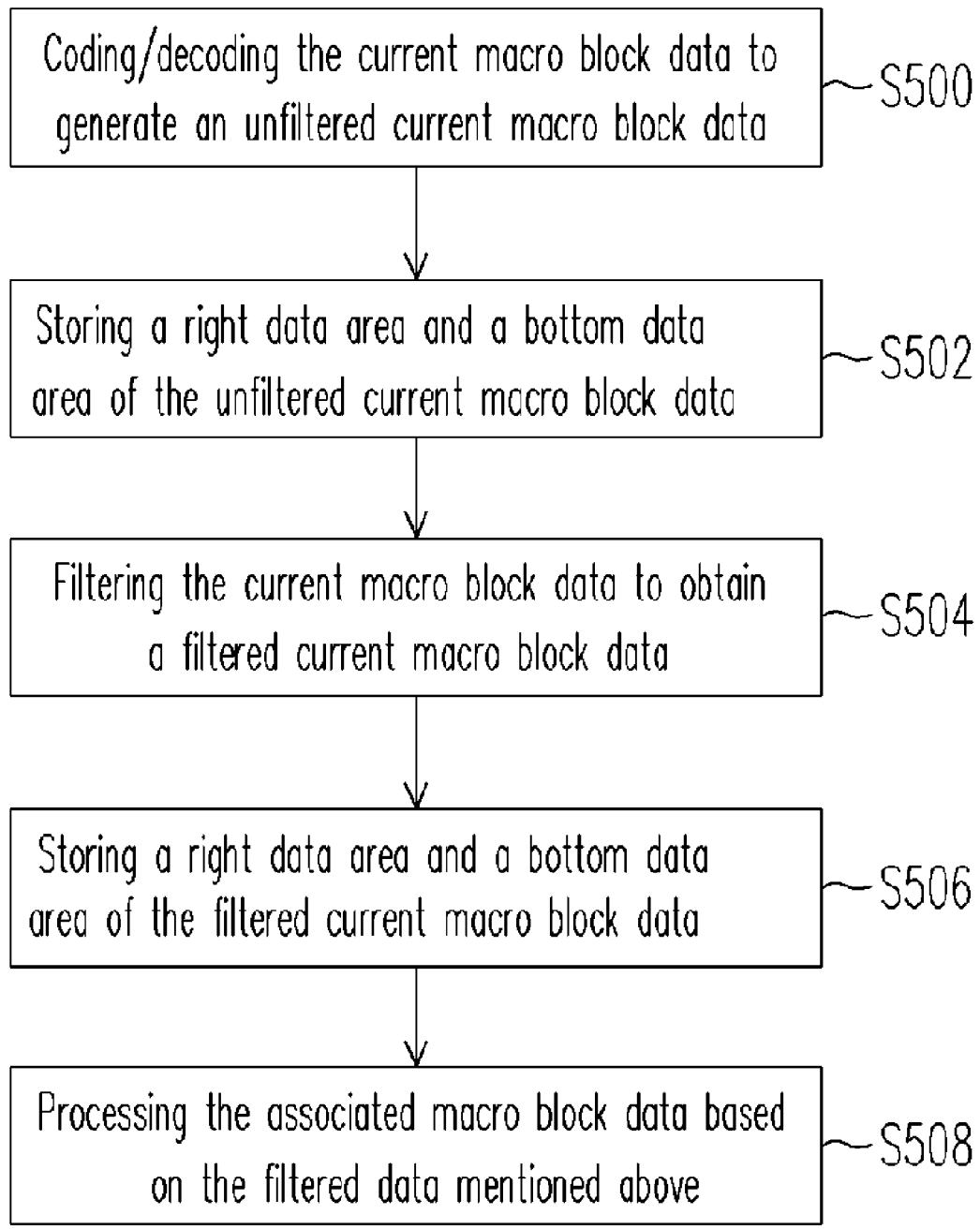
FIG. 5 schematically shows a flow chart illustrating a video coding/decoding method according to an embodiment of the present invention.

In summarizing the buffering methods mentioned above, a detailed description is provided hereinafter. FIG. 5 schematically shows a flow chart illustrating a video coding/decoding method according to an embodiment of the present invention. In the present embodiment, first, the current macro block is coded/decoded to generate an unfiltered current macro block data (step S500). Then, the right data area and the bottom data area of the unfiltered current macro block data are stored (step S502). Then, the unfiltered current macro block data obtained in step S502 is filtered, so as to generate a corresponding filtered current macro block data (step S504), and the right data area and the bottom data area of the filtered current macro block data are stored (step S506). Finally, the stored data areas are used for processing the associated macro blocks (step S508).

In summary, the present invention uses a cache of the top/bottom macro block data information and the left/right macro block data information to simplify the video image coding/decoding method. Wherein, the cache may be an unfiltered cache or a filtered cache depends on different object that the coding/decoding of the macro block is processed on. The content stored in the unfiltered cache is a cache line, and the content stored in the filtered cache is a plurality of cache lines (it may have at least four cache lines). Therefore, the content stored in the cache mentioned above is not a whole macro block as in the conventional technique.

A video image having M×N macro blocks is exemplified herein. After comparing the buffering technique of the present invention with the one in the prior art, it is known that the size of the information required to be reserved in the present invention is reduced to (M+1)×(32) Bytes. Therefore, it saves 206 times of the memory space for the CIF video stream, and saves 352 times of the memory space for the SD (720×480) video stream.

Under the condition of achieving the coding/decoding function defined by the new generation's video coding/decoding technique, the video coding/decoding buffering apparatus and the method thereof provided by the present invention use lower memory space, and the real time characteristic of the video image is also considered.

Although the invention has been described with reference to particular embodiments thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A video coding buffering apparatus, comprising:
    an image input unit for receiving a current macro block;
    an unfiltered data buffering unit for storing a part of a previously unfiltered macro block data, wherein the previously unfiltered macro block data is an unfiltered data contained in other macro block required for coding the current macro block;
    a coding unit electrically coupled to the unfiltered data buffering unit and the image input unit for coding the current macro block based on a content stored in the unfiltered data buffering unit, so as to output a plurality of bit streams and a corresponding unfiltered current macro block data;
    a filtered data buffering unit for storing a part of a previously filtered macro block data, wherein the previously filtered macro block data is a filtered data contained in other macro block required for filtering the current macro block;

a filtering unit electrically coupled to the coding unit and the filtered data buffering unit for filtering the unfiltered current macro block data based on the data stored in the filtered data buffering unit, so as to generate a filtered current macro block data; and an image buffering unit for storing a previously coded frame data and the filtered current macro block data.

2. A video decoding buffering apparatus for generating a current macro block, and the video decoding buffering apparatus comprising:

a bit stream input unit for receiving a current bit stream;

an unfiltered data buffering unit for storing another unfiltered data which is not contained in the current bit stream and is required for decoding the current bit stream;

a decoding unit electrically coupled to the unfiltered data buffering unit and the bit stream input unit for decoding the current bit stream, so as to generate an unfiltered current macro block data of the current macro block;

a filtered data buffering unit for storing a part of a previously filtered macro block data, wherein the previously filtered macro block data is a filtered data contained in other macro block required for filtering the current macro block;

a filtering unit electrically coupled to the decoding unit and the filtered data buffering unit for filtering the unfiltered current macro block data based on the data stored in the filtered data buffering unit, so as to generate a filtered current macro block data of the current macro block; and an image buffering unit for storing a previously decoded frame data and the filtered current macro block data.

3. A video coding/decoding buffering method, comprising:

coding/decoding a current macro block to generate an unfiltered current macro block data;

storing a right data area and a bottom data area of the unfiltered current macro block data; and processing the next macro block data.

4. The video coding/decoding buffering method of claim 3, wherein the right data area and the bottom data area are stored in an unfiltered cache of a memory.

5. The video coding/decoding buffering method of claim 4, wherein the unfiltered cache further stores a top data area and a left data area that are outside of the current macro block.

6. The video coding/decoding buffering method of claim 5, wherein the top data area comprises Y, Cb, and Cr of the unfiltered data that is on the top and outside of the current macro block.

7. The video coding/decoding buffering method of claim 5, wherein the left data area comprises Y, Cb, and Cr of the unfiltered data that is on the left and outside of the current macro block.

8. The video coding/decoding buffering method of claim 3, wherein the right data area comprises Y, Cb, and Cr of the unfiltered data that is on the right and inside of the current macro block.

9. The video coding/decoding buffering method of claim 3, wherein the bottom data area comprises Y, Cb, and Cr of the unfiltered data that is on the bottom and inside of the current macro block.

10. A video coding/decoding buffering method, comprising:

filtering an unfiltered current macro block data of a current macro block to generate a filtered current macro block data;

storing a right data area and a bottom data area of the filtered current macro block data; and processing the next macro block data.

11. The video coding/decoding buffering method of claim 10, wherein the right data area and the bottom data area are stored in a filtered cache of a memory.

12. The video coding/decoding buffering method of claim 11, wherein the filtered cache further stores a top data area and a left data area that are outside of the current macro block.

13. The video coding/decoding buffering method of claim 12, wherein the top data area comprises Y, Cb, and Cr of the filtered data that is on the top and outside of the current macro block.

14. The video coding/decoding buffering method of claim 12, wherein the left data area comprises Y, Cb, and Cr of the filtered data that is on the left and outside of the current macro block.

15. The video coding/decoding buffering method of claim 10, wherein the right data area comprises Y, Cb, and Cr of the filtered data that is on the right and inside of the current macro block.

16. The video coding/decoding buffering method of claim 10, wherein the bottom data area comprises Y, Cb, and Cr of the filtered data that is on the bottom and inside of the current macro block.

17. A video coding/decoding buffering method, comprising:

configuring an unfiltered image cache and a filtered image cache;

coding/decoding a current macro block to generate an unfiltered current macro block data;

storing a right data area and a bottom data area of the unfiltered current macro block data;

filtering the unfiltered current macro block data to generate a filtered current macro block data;

storing a right data area and a bottom data area of the filtered current macro block data; and processing the next macro block data.

* * * * *